United States Patent [19]
Rocca et al.

[11] Patent Number: 5,993,343
[45] Date of Patent: Nov. 30, 1999

[54] STRETCHER FOR A TRANSMISSION BELT

[75] Inventors: Carlo Rocca, Turin, Italy; Marc Theobald, Wadgassen, Germany; Angelo Mennuti, Nichelino, Italy

[73] Assignee: Dayco Europe S.p.A., Colonnella, Italy

[21] Appl. No.: 09/012,689

[22] Filed: Jan. 26, 1998

[30] Foreign Application Priority Data

Jan. 31, 1997 [IT] Italy .................................. TO97A0074

[51] Int. Cl.$^6$ ........................................................ F16H 7/12
[52] U.S. Cl. .......................... 474/135; 474/117; 474/133
[58] Field of Search .......................... 474/109, 110–111, 474/113–117, 136, 133, 135, 138; 206/329

[56] References Cited

U.S. PATENT DOCUMENTS

| | | |
|---|---|---|
| 2,490,974 | 12/1949 | Mallory . |
| 4,596,538 | 6/1986 | Henderson . |
| 4,657,137 | 4/1987 | Johnson .................................. 206/329 |
| 4,934,988 | 6/1990 | Kawamura et al. ................. 474/135 X |
| 4,938,734 | 7/1990 | Green et al. . |
| 4,981,461 | 1/1991 | Henderson .............................. 474/135 |
| 5,030,171 | 7/1991 | Henderson .............................. 474/135 |
| 5,035,679 | 7/1991 | Green et al. .............................. 474/135 |
| 5,234,385 | 8/1993 | Kawashima et al. ................... 474/135 |

FOREIGN PATENT DOCUMENTS

| | | |
|---|---|---|
| 00482781 | 4/1992 | European Pat. Off. . |
| 196 23 485 | 12/1996 | Germany . |

*Primary Examiner*—Tamara L. Graysay
*Assistant Examiner*—Marcus Charles
*Attorney, Agent, or Firm*—Stevens, Davis, Miller & Mosher, L.L.P.

[57] ABSTRACT

Stretcher for a transmission belt comprising a fixed part suitable for being rigidly connected to a support structure and provided with a pin defining a first axis, a movable part comprising a hub rotating on the pin about the first axis, a pulley carried by the movable part and rotating with respect thereto about a second axis distinct from the first axis and parallel thereto, and a spiral spring interposed between the fixed part and the movable part and suitable for loading in use the movable part in the direction tending to keep the pulley in engagement with the relative belt. The spring has an internal end secured to the pin, and an external end secured to the hub, and is interposed between two bushes which support the hub on the fixed part and are provided with respective flanges cooperating axially with the spring.

6 Claims, 1 Drawing Sheet

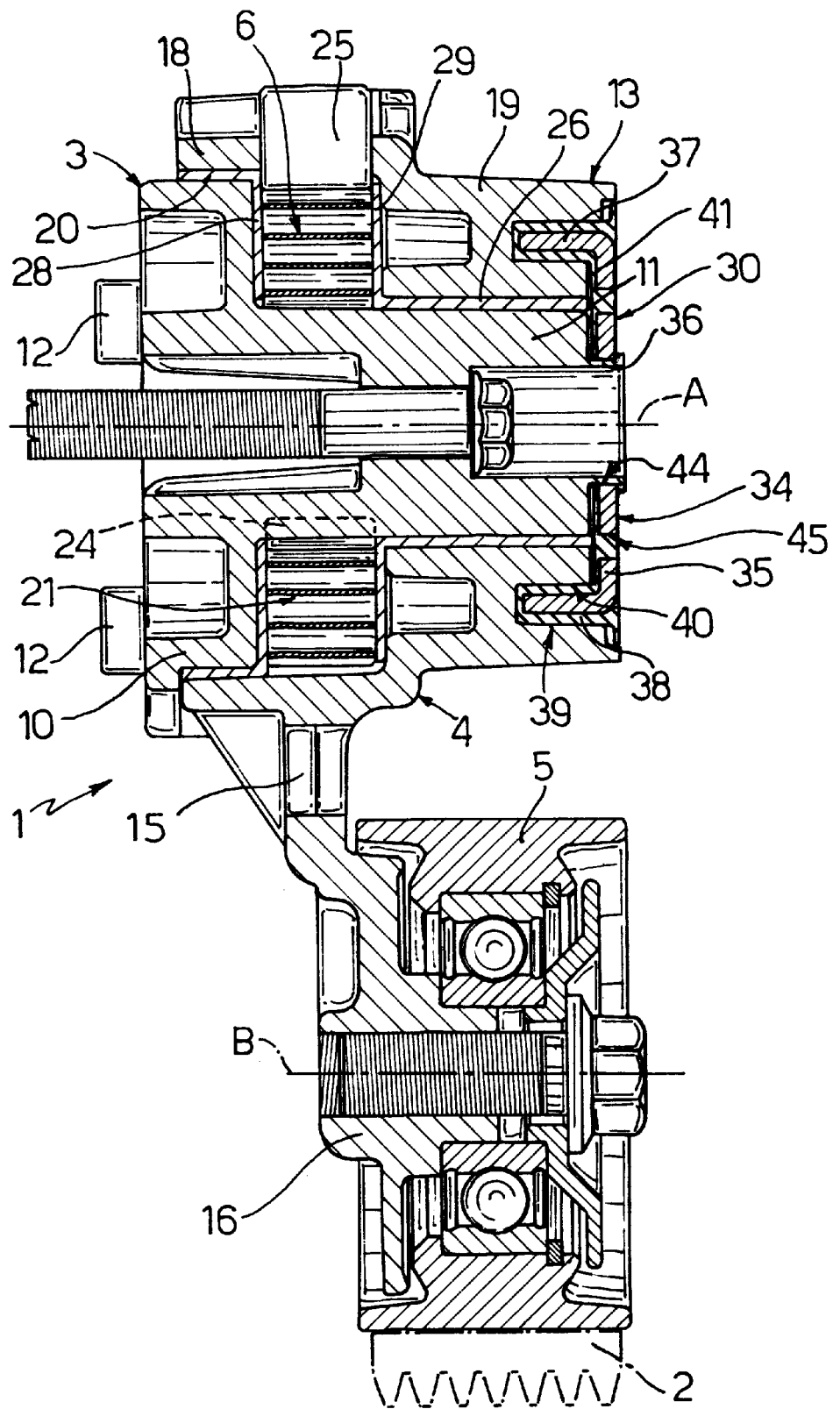

STRETCHER FOR A TRANSMISSION BELT

BACKGROUND OF THE POTION

The invention relates to a stretcher for a transmission belt and particularly but not exclusively for a belt for transmitting motion from the drive shaft of an internal combustion engine to auxiliary elements driven by the said engine.

Stretchers are known which comprise a fixed part suitable for being rigidly connected to a support structure integral with the engine block, a movable part hinged to the fixed part about a first axis, a pulley carried by the movable part and rotating with respect thereto about a second axis distinct from the first axis and parallel thereto, and a spring interposed between the fixed part and the movable part, which loads the movable part in the direction tending to keep the pulley in engagement with the relative belt.

Variations in belt tension due to the selective actuation of the various accessories and to wear are therefore compensated by consequent variations in the deformation of the spring and corresponding movements of the axis of rotation of the pulley.

According to a known embodiment, the fixed part comprises a pin defining the first axis, and the movable part comprises a hub rotating on the pin with the interposition of a bush, also having the function of damping by friction the oscillations of the movable part under the pulsating load transmitted by the belt to the pulley, and thus to the said movable part. The spring, a spiral one, is wound round the hub and has an internal end secured to the said hub and an external end secured to a flange of the fixed part.

The known stretchers of the type briefly described have a number of disadvantages.

Because the pulley is supported in projecting manner by the movable part, the pull of the belt causes a tilting moment on the said movable part (i.e. tending to rotate the latter about an axis transverse to its own axis of rotation). The tilting moment is balanced by the restraining reaction of the fixed part through the bush; this tends, however, to stress the bush in anomalous manner, creating non-uniform wear in it.

Obviously, the effects of the tilting moment could be reduced by increasing the dimensions of the pin and the bush whilst retaining the same configuration; this would, however, involve an undesirable increase in the size of the hub and hence also of the fixed part.

SUMMARY OF THE INVENTION

The object of the invention is to produce a stretcher which does not have the disadvantages associated with the known stretchers specified above, and which is of modest size.

This object is achieved by the invention in that it relates to a stretcher for a transmission belt of the type comprising a fixed part suitable for being rigidly connected to a support structure and provided with a pin defining a first axis, a movable part provided with a hub mounted on the pin rotating about the said first axis with the interposition of a first bush, a pulley carried by the said movable part and rotating with respect thereto about a second axis distinct from the first axis and parallel thereto and flexible means interposed between the said fixed part and the said movable part and suitable for loading in use the movable part in the direction tending to keep the pulley in engagement with the relative belt, wherein the said flexible means comprise a spiral spring wound round the pin and having an internal end secured to the said pin and an external end secured to an annular portion of the hub, the stretcher also comprising a second bush interposed between the annular portion of the hub and the fixed part, the bushes being disposed on parts axially opposite with respect to the spring.

BRIEF DESCRIPTION OF THE DRAWING

For an improved understanding of the invention a preferred embodiment will now be described below, by way of non-exhaustive example and with reference to the accompanying drawing which shows an axial section thereof.

DETAILED DESCRIPTION OF THE INVENTION

With reference to the illustration, in its entirety 1 denotes a stretcher for a belt 2 with multiple grooves (multi-V) for driving the auxiliary elements (not shown) of an internal combustion engine (not shown).

In known manner the stretcher 1 substantially comprises a fixed part 3 suitable for being rigidly connected to a support structure (not shown), such as a support plate for the auxiliary elements which is fixed to the engine block, a movable part 4 hinged to the fixed part 3 about a first axis A, a pulley 5 carried in projecting manner by the movable part 4 and rotating with respect thereto about a second axis B distinct from the first axis A and parallel thereto, and a spring 6 interposed between the fixed part 3 and the movable part 4, which loads the movable part in the direction tending to keep the pulley 5 in engagement with the belt 2.

More particularly, the fixed part 3 integrally comprises a flange 10 suitable for cooperating axially with the support structure and a tubular pin 11 of axis A extending axially in projecting manner from the flange 10. The flange 10 has a plurality of frontal teeth 12 suitable for engaging respective seats (not shown) of the support structure to anchor the fixed part 3 in the angular direction.

The movable part 4 integrally comprises a hub 13 coaxial to the pin 11 and mounted in a rotating manner thereon, an arm 15 extending radially in a projecting manner from the hub 13, and a tubular portion 16, of axis B, integrally connected to an end of the arm 15 and having the function of supporting the pulley 5.

The hub 13 of the movable part 4 is substantially bell-shaped and comprises a first portion 18 and a second portion 19 which are axially adjacent and have a larger and smaller diameter respectively.

For a section of its own axial length, the first portion 18 is disposed round the flange 10 and is supported radially thereon by means of a bush 20 which, with the flange 10, defines a friction torque of pre-determined coefficient. For the remaining section of its own length the first portion 18 delimits with the pin 11 an annular chamber 21 housing the spring 6. The latter comprises a strip of steel spiral-wound round the pin 11 and having an internal end 24 secured in known manner to the pin 11 and an external end 25 secured in known manner to the portion 18.

The second portion 19 is supported radially by the pin 11 with the interposition of a bush 26 which defines with the pin 11 a friction torque of pre-determined coefficient.

The bush 20 and the bush 26 have respective end, internal and external respectively, flat annular flanges 28, 29 which cooperate axially with opposite flanks of the spring 6 and are interposed between the latter and, respectively, the flange 10 and the second portion 19 of the hub 13.

Finally the stretcher 1 comprises a damping element 30 interposed between the pin 11 and the movable part 4.

The damping element 30 substantially comprises a metallic cupped core 34 having a substantially flat circular base wall 35 rigidly fixed onto a free end 36 of reduced diameter of the pin 11 and a substantially cylindrical lateral wall 37 extending in projecting manner from an external periphery of the base wall 35.

The damping element 30 also has a coating 38 of plastic material extending over the face of the base wall 35 facing towards the hub 13 and over the entire surface of the lateral wall 37, so as to form therewith an annular friction crown 39 engaging an annular seat 40, of complementary form, produced on a front face 41 of the portion 19 of the hub 13. The material of the coating 38 is selected so as to define with the hub 13 a friction torque of pre-determined coefficient to ensure, in use, adequate oscillation damping properties. The contact between the annular crown 39 and the relative seat 40 conveniently takes place either along the internal and external cylindrical surfaces, or along the annular front surface of the crown 39.

The core 34 is provided with an axial hole 44, engaged in forced manner by the end 36 of the pin 11; the end 36 is thus pressed onto the internal edge of the base wall 35 so as to ensure a "pack" mounting on the pin 11, i.e. substantially with no axial play, of the group comprising the bush 20, the spring 6, the bush 26 and the hub 13.

The coating 38 is applied to the core 34 by means of over-moulding; for this purpose the core 34 is provided with a plurality of holes 45 surrounding the axial hole 44 and suitable for being engaged by the material of the coating 38, during the molding phase, to ensure the anchorage of the coating 38 to the core 34.

The operation ok the stretcher 1 is per se known and will not therefore be described in detail.

The arrangement of the spring 6, with the internal end 24 secured to the pin 11 and the external end 25 to the portion 18 of the hub 13 enables the diameter of the pin 11 to be increased without penalizing the overall size of the hub. The tilting moment caused by the pull of the belt is efficiently balanced by the bushes 20, 26, which have a large diameter and are spaced between them axially so as to generate restraining reactions the resultants of which have a relatively long arm.

Furthermore, the radial flanges 28, 29 of the bushes 20, 26 and the damping element 30 help both to damp the oscillations and to support the movable part 4 with respect to the fixed part 3, further reducing the effects of the tilting moment.

Finally, it will be clear that modifications and variants which do not depart from the protective scope of the invention may be introduced to the stretcher 1 described.

We claim:

1. Stretcher (1) for a transmission belt (2) comprising:
   a fixed part (3) adapted to be rigidly connected to a support structure and provided with a pin (11) defining a first axis (A),
   a first bush having a first axial portion,
   a movable part (4) provided with a hub (13) mounted on the pin (11) rotating about the first axis (A) with the interposition of the first axial portion of the first bush (26),
   a pulley (5) carried by the movable part (4) and rotating with respect thereto about a second axis (B) distinct form the first axis (A) and parallel thereto,
   flexible means (6) interposed between the fixed part (3) and the movable put (4) and suitable for loading the movable part (4) in the direction tending to keep the pulley (5) in engagement with the belt (2),
   wherein the flexible means comprises a spiral spring (6) wound around the pin (11), the flexible means having an internal end (24) secured to the pin (11) and an external end (25) secured to an annular portion (18) of the hub (13),
   the stretcher (1) also comprising a second bush (20) having a second axial portion radially interposed between and contacting the annular portion (18) of the hub (13) and the fixed part (3), the axial portions of the bushes (20, 26) being disposed on axially opposite sides of the spring (6).

2. Stretcher according to claim 1, wherein the bushes (20, 26) comprise respective radial flanges (29, 28) contacting axially opposite ends of the spring (6).

3. Stretcher according to claim 1, comprising a damping element (30) provided with a securing portion (35) rigidly fixed to one member of the group consisting of the fixed part (3) and movable part (4) and with an annular friction portion (39) extending axially from the securing portion (35) and cooperating with a seat (40) produced in another member of the group consisting of the fixed part (3) and movable part (4) and having a form complementary to the annular friction portion (39).

4. Stretcher according to claim 3, wherein the damping element (30) comprises a metallic core (34) and a coating (38) of plastic material extending at least over the annular friction portion (39).

5. Stretcher according to claim 1, wherein the securing portion is a substantially flat base wall (35) of the damping element (30) fixed to the pin (11) of the fixed part (3) of the stretcher (1), and that the annular friction portion (39) is substantially cylindrical in shape and extends in a projecting manner from a periphery of the base wall (35), the seat being produced in the movable part (4) of the stretcher (1).

6. Stretcher according to claim 5, wherein the base wall (35) of the damping element (30) is fixed to an end portion (36) of the pin (11), the seat (40) for the annular friction portion (39) of the damping element (30) being produced on a front face (41) of the hub (13).

* * * * *